US010260363B2

(12) United States Patent
Snider et al.

(10) Patent No.: US 10,260,363 B2
(45) Date of Patent: Apr. 16, 2019

(54) ADDITIVE MANUFACTURED SEAL FOR INSERT COMPARTMENTALIZATION

(71) Applicant: General Electric Company, Schenectady, NY (US)

(72) Inventors: Zachary John Snider, Simpsonville, SC (US); Sandip Dutta, Greenville, SC (US); Kassy Moy Hart, Greenville, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 116 days.

(21) Appl. No.: 15/372,642

(22) Filed: Dec. 8, 2016

(65) Prior Publication Data

US 2018/0163555 A1 Jun. 14, 2018

(51) Int. Cl.
| | | |
|---|---|---|
| *F01D 11/00* | (2006.01) | |
| *F16J 15/08* | (2006.01) | |
| *F01D 25/12* | (2006.01) | |
| *F01D 9/02* | (2006.01) | |
| *F01D 5/18* | (2006.01) | |
| *B22F 3/105* | (2006.01) | |

(52) U.S. Cl.
CPC .......... *F01D 11/003* (2013.01); *B22F 3/1055* (2013.01); *F01D 5/18* (2013.01); *F01D 5/189* (2013.01); *F01D 9/02* (2013.01); *F01D 25/12* (2013.01); *F16J 15/0887* (2013.01); *F16J 15/0893* (2013.01); *F05D 2220/32* (2013.01); *F05D 2230/22* (2013.01); *F05D 2230/234* (2013.01); *F05D 2240/55* (2013.01); *F05D 2250/75* (2013.01); *F05D 2260/201* (2013.01); *F05D 2260/30* (2013.01)

(58) Field of Classification Search
CPC . F01D 11/003; F01D 5/18; F01D 25/12; F16J 15/0893
See application file for complete search history.

(56) References Cited

U.S. PATENT DOCUMENTS

| | | | |
|---|---|---|---|
| 3,767,322 A | 10/1973 | Durgin et al. | |
| 3,891,348 A * | 6/1975 | Auxier | F01D 5/189 416/96 A |
| 3,930,748 A | 1/1976 | Redman et al. | |

(Continued)

FOREIGN PATENT DOCUMENTS

| | | |
|---|---|---|
| EP | 0182588 B1 | 9/1988 |
| EP | 1 852 572 A2 | 11/2007 |

(Continued)

OTHER PUBLICATIONS

Extended European Search Report and Opinion issued in connection with corresponding EP Application No. 17204881.1 dated Mar. 7, 2018.

*Primary Examiner* — Eugene G Byrd
(74) *Attorney, Agent, or Firm* — Ernest G. Cusick; Hoffman Warnick LLC

(57) ABSTRACT

Aspects of the disclosure include a sealing insert, turbine component, and code for manufacturing a sealing insert. A sealing insert includes at least one insert wall for insertion proximate a component wall to define a space between the at least one insert wall and the component wall. At least one compressible seal is provided between the at least one insert wall and the component wall. The compressible seal or seals divide the space into a plurality of compartments.

20 Claims, 4 Drawing Sheets

(56) References Cited

U.S. PATENT DOCUMENTS

| | | | |
|---|---|---|---|
| 4,168,938 A * | 9/1979 | Dodd | F01D 5/188 |
| | | | 415/115 |
| 4,252,501 A | 2/1981 | Peill | |
| 4,297,077 A * | 10/1981 | Durgin | F01D 5/189 |
| | | | 416/97 R |
| 5,120,192 A * | 6/1992 | Ohtomo | F01D 5/189 |
| | | | 415/115 |
| 6,183,192 B1 * | 2/2001 | Tressler | F01D 5/189 |
| | | | 415/115 |
| 6,283,708 B1 * | 9/2001 | Zelesky | F01D 5/189 |
| | | | 416/97 R |
| 6,464,456 B2 | 10/2002 | Darolia et al. | |
| 6,742,991 B2 | 6/2004 | Soechting et al. | |
| 7,121,796 B2 | 10/2006 | Burdgick et al. | |
| 8,079,821 B2 | 12/2011 | Campbell et al. | |
| 8,556,578 B1 | 10/2013 | Memmen et al. | |
| 8,714,565 B1 | 5/2014 | Cornett et al. | |
| 8,777,569 B1 | 7/2014 | Liang | |
| 9,896,954 B2 * | 2/2018 | Walston | F01D 11/003 |
| 2010/0068034 A1 | 3/2010 | Schiavo et al. | |
| 2010/0313419 A1 | 12/2010 | Stampfli et al. | |
| 2012/0177478 A1 | 7/2012 | Giri et al. | |
| 2012/0243995 A1 * | 9/2012 | Bunker | F01D 5/18 |
| | | | 416/95 |
| 2015/0139814 A1 * | 5/2015 | Horiuchi | F01D 5/187 |
| | | | 416/97 R |
| 2015/0233261 A1 * | 8/2015 | Hodgkinson | F01D 11/005 |
| | | | 277/594 |
| 2015/0360287 A1 | 12/2015 | Zink et al. | |

FOREIGN PATENT DOCUMENTS

| | | |
|---|---|---|
| EP | 2 204 537 A2 | 7/2010 |
| EP | 2 607 624 A1 | 6/2013 |
| EP | 2 975 217 A1 | 1/2016 |
| EP | 3 075 531 A1 | 10/2016 |
| GB | 2084262 A | 4/1982 |

\* cited by examiner

ADDITIVE MANUFACTURED SEAL FOR INSERT COMPARTMENTALIZATION

TECHNICAL FIELD

The disclosure relates generally to airfoil blades, such as vanes/nozzles in turbomachines. More particularly, embodiments of the present disclosure provide sealing inserts, turbine components, and code for making laser-sintered components for cooling hollow airfoils from the inside with directed fluid, such as air.

BACKGROUND

The pace of change and improvement in the realms of power generation, aviation, and other fields has accompanied extensive research for manufacturing components used in these fields. Conventional manufacture of metallic components generally includes milling or cutting away regions from a slab of metal before treating and modifying the cut metal to yield a part, which may have been simulated using computer models and computer aided design. Manufactured components which may be formed from metal include airfoil components for installation in a turbomachine such as an aircraft engine or power generation system, as well as mechanical components for other manufacturing, transportation, and structural systems.

The development of additive manufacturing, also known in the art as "3D printing," can reduce manufacturing costs by allowing such components to be formed more quickly, with unit-to-unit variations as appropriate. Additive manufacturing also increases the ability to manufacture complex shapes that may have been difficult to achieve through casting, subtractive, or other conventional manufacturing methods. Among other advantages, additive manufacture can directly apply computer-generated models to a manufacturing process while relying on a common additive manufacturing platform across products, components, and variations and customizations thereof.

One of the design characteristics and limitations of airfoil blades in a turbomachine may be the blades' cooling ability. Individual blade designs may take cooling features into consideration depending on the stage, size, operating range, duty cycle, and other characteristics of the blade location, turbomachine system, and other operating conditions. Cooling features may include blade shape, surface features, cooling channels, internal chambers, impingement jets, and other features for directing cooling fluids in a heat transfer relationship with some portion of the blade. For example, some blade designs include a hollow interior and accommodate one or more inserts for dividing the hollow interior into separate cooling chambers. Some inserts may define a cooling space between an outer wall of the insert and the interior surface of the blade body. The insert may receive the cooling fluid (cooler air) in an interior space in the insert and include impingement jets for distributing the cooling fluid into the cooling space.

SUMMARY

A first aspect of the disclosure provides a sealing insert for a component. The sealing insert includes at least one insert wall for insertion proximate a component wall to define a space between the insert wall and the component wall. The sealing insert also includes at least one compressible seal between the insert wall and the component wall. The compressible seal divides the space into a plurality of compartments and the compartments each have at least one fluid inlet and at least one fluid outlet that are separate from each other compartment.

A second aspect of the disclosure provides a turbine component with a sealing insert. The turbine component includes a component wall defining a component interior space and an insert. The insert includes at least one insert wall and is inserted into the component interior space to define a space between the insert wall and the component wall. There is at least one compressible seal between the insert wall and the component wall. The compressible seal or seals divide the space into a plurality of compartments. The compartments each have at least one fluid inlet and at least one fluid outlet that are separate from each other compartment.

A third aspect of the invention provides non-transitory computer readable storage medium storing code representative of a laser-sintered sealing insert. The sealing insert is physically generated upon execution of the code. The sealing insert includes at least one insert wall for insertion proximate a component wall to define a space between the insert wall and the component wall. At least one compressible seal is provided between the insert wall and the component wall. The at least one compressible seal divides the space into a plurality of compartments. The compartments each have at least one fluid inlet and at least one fluid outlet that are separate from each other compartment.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

Figure 1:
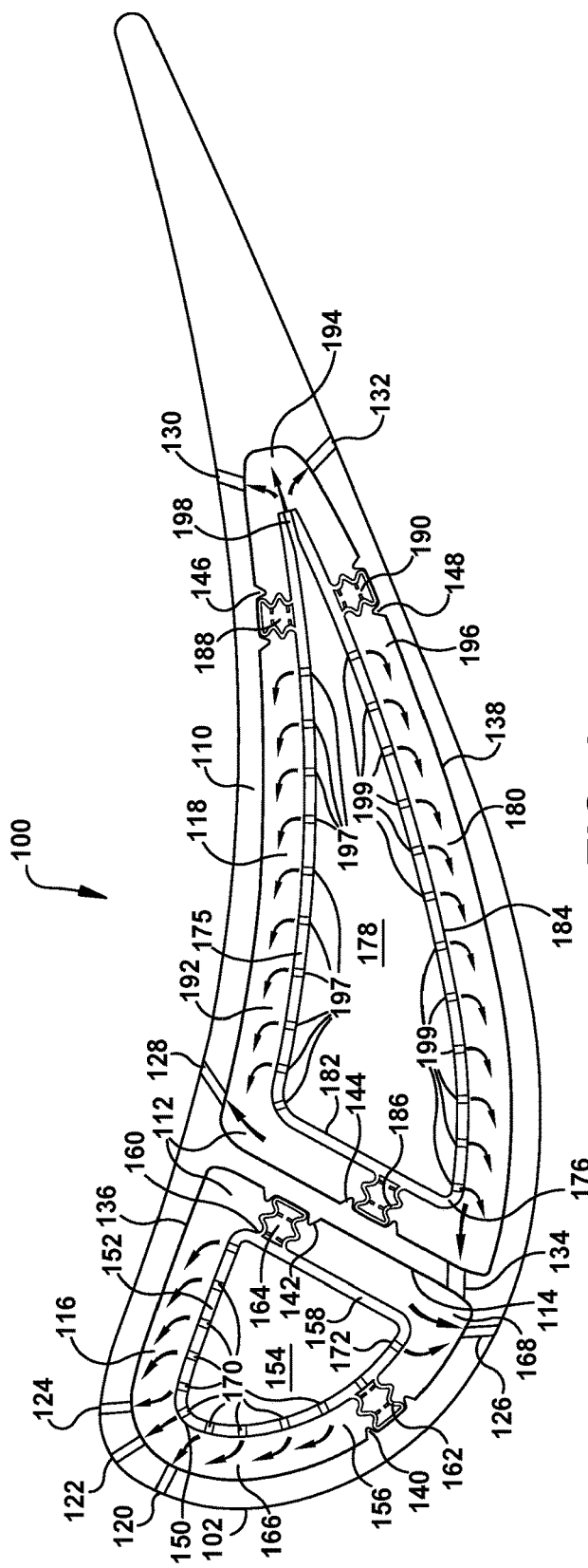
FIG. 1 shows a cross-section view of an example turbine component with sealing inserts.

It is noted that the drawings of the invention are not necessarily to scale. The drawings are intended to depict only typical aspects of the invention, and therefore should not be considered as limiting the scope of the invention. In the drawings, like numbering represents like elements between the drawings.

DETAILED DESCRIPTION

In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings and it is to be understood that other embodiments may be used and that changes may be made without departing from the scope of the present teachings. The following description is, therefore, merely exemplary.

Where an element or layer is referred to as being "on," "engaged to," "disengaged from," "connected to" or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

FIG. 1 depicts an example turbine component 100, such as a gas turbine airfoil, incorporating two sealing inserts 150, 175. Component 100 may be an airfoil component operating in high temperature environment and requiring circulation of a cooling fluid, such as air that is cooler than the air outside the component, through an interior space. Component 100 includes an outer component wall (or walls) 110 defining a component interior space 112 and an exterior component surface 102. Outer component wall 110 may be defined as a continuous wall defining and enclosing component interior space 112 or a plurality of adjoining walls, such as a front wall and two side walls around component interior space 112. Component 100 may include a component interior wall 114 separating component interior space 112 into a forward insert space 116 and a trailing insert space 118. In the example shown, component 100 includes a forward sealing insert 150 in forward insert space 116 and a trailing sealing insert 175 in trailing insert space 118. Outer component wall 110 may define a plurality of cooling fluid outlets 120, 122, 124, 126, 128, 130, 132. In some embodiments, cooling fluid outlets 120, 122, 124, 126, 128, 130, 132 may be grouped to provide outlets from separate portions of component interior space 112. For example, cooling fluid outlets 120, 122, 124, 126 may provide fluid outlets for forward insert space 116 and fluid outlets 128, 130, 132 may provide fluid outlets for trailing insert space 118. In some embodiments, component interior wall 114 may include one or more fluid paths, such as cooling fluid passage 134, to allow cooling fluid to pass between separate interior spaces, such as trailing insert space 118 and forward insert space 116. Outer component wall 110 and component interior wall 114 may have an interior component surfaces 136, 138 defining and enclosing forward insert space 116 and trailing insert space 118, respectively. In some embodiments, interior component surface 136 may include guide channels 140, 142, 144, 146, 148 for receiving and positioning compressible seals 162, 164, 186, 188, 190.

Forward sealing insert 150 includes a forward insert wall (or walls) 152 defining and enclosing a forward insert interior space 154. Forward insert wall 152 may be defined as a continuous wall defining and enclosing forward insert interior space 154 or a plurality of adjoining walls, such as a rear wall and two side walls around forward insert interior space 154. In some embodiments, forward insert interior space 154 receives the cooling fluid from an inlet in the base of component 100 for distribution through component interior space 112 and, more specifically for distribution into a forward cooling space 156. In some embodiments, forward insert wall 152 may effectively divide forward insert space 116 between forward insert interior space 154 inside forward insert wall 152 and forward cooling space 156 outside of forward insert wall 152. Forward insert wall 152 may have an insert wall inside surface 158 and an insert wall outside surface 160. Forward cooling space 156 may be defined as the space between insert wall outside surface 160 and outer component wall 110 and forward surface of component interior wall 114.

Forward sealing insert 150 may include several compressible seals 162, 164 extending from insert wall outside surface 160. In some embodiments, compressible seals 162, 164 may include seals that are compressed prior to or during installation in component 100 and/or seals that expand during operation to create a compression force between outer component wall 110 and compressible seals 162, 164. Compressible seals 162, 164 divide forward cooling space 156 into multiple cooling compartments 166, 168. Compressible seals 162, 164 substantially prevent fluid flow between cooling compartments 166, 168 across compressible seals 162, 164. For example, cooling compartment 166 may be defined by a portion of outer component wall 110, a portion of component interior wall 114, a portion of forward insert wall 152, and compressible seals 162, 164. Cooling compartment 168 may be defined by a portion of component interior wall 114, a portion of outer component wall 110, a portion of forward insert wall 152, and compressible seals 162, 164. In some embodiments, cooling compartments 166, 168 may receive cooling fluid through defined inlet paths and exhaust used cooling fluid through defined outlet paths. In some embodiments, impingement jets 170, 172 defined in forward insert wall 152 may provide at least partial inlet paths for cooling compartments 166, 168. For example, impingement jets 170 provide a cooling fluid inlet to cooling compartment 166 from forward insert interior space 154. Impingement jet 172 along with cooling fluid passage 134 provide a cooling fluid inlet to cooling compartment 168. In some embodiments, cooling fluid outlets 120, 122, 124, 126 in outer component wall 110 may provide outlet paths for cooling compartments 166, 168. For example, cooling fluid outlets 120, 122, 124 provide a cooling fluid outlet from cooling compartment 166 and cooling fluid outlet 126 provides a cooling fluid outlet from cooling compartment 168. In the embodiment shown, cooling compartment 166 has separate cooling fluid inlets and outlets from cooling compartment 168, defining separate cooling fluid flow paths, volumes, and pressures to the different cooling compartments 166, 168 and the portions of component 100 that are to be cooled.

Trailing sealing insert 175 includes a trailing insert wall (or walls) 176 defining and enclosing a trailing insert interior space 178. Trailing insert wall 176 may be defined as a continuous wall defining and enclosing trailing insert interior space 178 or a plurality of adjoining walls, such as a rear wall and two side walls around forward insert interior space 178. In some embodiments, trailing insert interior space 178 receives the cooling fluid from an inlet in the base of component 100 for distribution through component interior space 112 and, more specifically for distribution into a trailing cooling space 180. In some embodiments, trailing insert wall 176 may effectively divide trailing insert space 118 between trailing insert interior space 178 inside trailing insert wall 176 and trailing cooling space 180 outside of trailing insert wall 176. Trailing insert wall 176 may have an insert wall inside surface 182 and an insert wall outside surface 184. Trailing cooling space 180 may be defined as the space between insert wall outside surface 182 and outer component wall 110 and a trailing surface of component interior wall 114.

Trailing sealing insert 175 may include several compressible seals 186, 188, 190 extending from insert wall outside surface 182. In some embodiments, compressible seals 186, 188, 190 may include seals that are compressed prior to or during installation in component 100 and/or seals that expand during operation to create a compression force between outer component wall 110 and compressible seals 186, 188, 190. Compressible seals 186, 188, 190 divide trailing cooling space 180 into multiple cooling compartments 192, 194, 196. Compressible seals 186, 188, 190 substantially prevent fluid flow between adjacent cooling compartments 192, 194, 196 across compressible seals 186, 188, 190. For example, cooling compartment 192 may be defined by a portion of outer component wall 110, a portion of component interior wall 114, a portion of trailing insert wall 176, and compressible seals 186, 188. Cooling compartment 194 may be defined by a portion of outer component wall 110, a portion of trailing insert wall 176, and compressible seals 188, 190. Cooling compartment 196 may be defined by a portion of outer component wall 110, a portion of component interior wall 114, a portion of trailing insert wall 176, and compressible seals 186, 190. In some embodiments, cooling compartments 192, 194, 196 may receive cooling fluid through defined inlet paths and exhaust used cooling fluid through defined outlet paths. In some embodiments, impingement jets 197, 198, 199 defined in trailing insert wall 176 may provide at least partial inlet paths for cooling compartments 192, 194, 196. For example, impingement jets 197 provide a cooling fluid inlet to cooling compartment 192 from trailing insert interior space 178. Impingement jet 198 provides a cooling fluid inlet to cooling compartment 194 from trailing insert interior space 178. Impingement jets 199 provide a cooling fluid inlet to cooling compartment 196 from trailing insert interior space 178. In some embodiments, cooling fluid outlets 128, 130, 132 in outer component wall 110 and cooling fluid passage 134 may provide outlet paths for cooling compartments 192, 194, 196. For example, cooling fluid outlets 128 provides a cooling fluid outlet from cooling compartment 192, cooling fluid outlets 130, 132 provide cooling fluid outlets from cooling compartment 194, and cooling fluid passage 134 provides a cooling fluid outlet from cooling compartment 196. In the embodiment shown, cooling compartment 192 has separate cooling fluid inlets and outlets from cooling compartments 194, 196, cooling compartment 194 has separate cooling fluid inlets and outlets from cooling compartments 192, 196, and cooling compartment 196 has separate cooling fluid inlets and outlets from cooling compartments 192, 194, each defining separate cooling fluid flow paths, volumes, and pressures to the different cooling compartments 192, 194, 196 and the portions of component 100 that are to be cooled.

Figure 2:
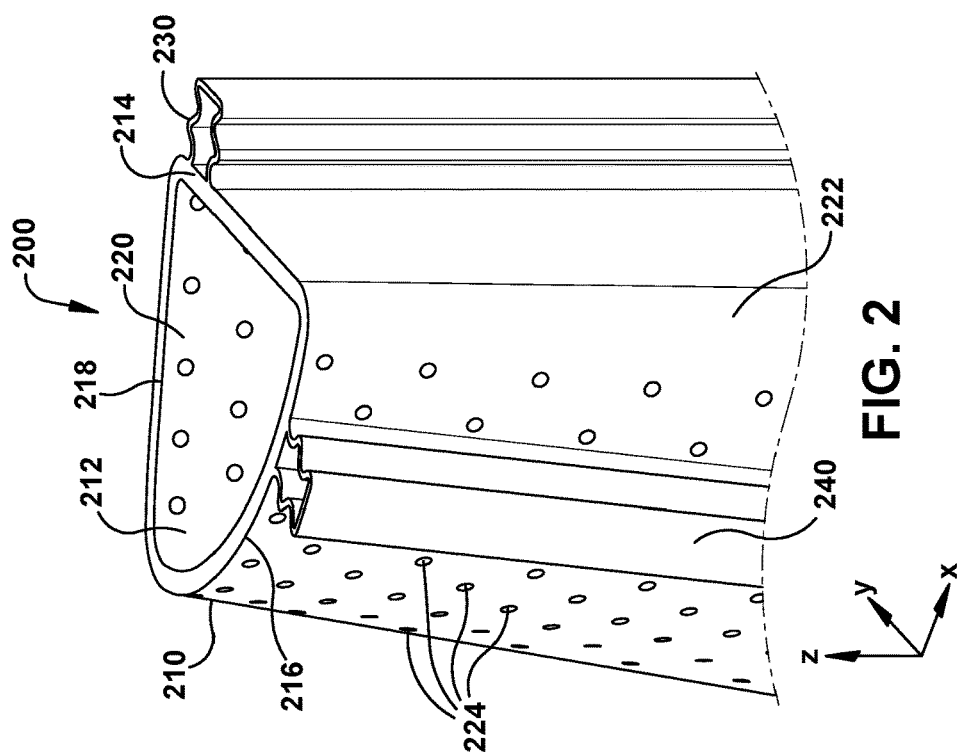
FIG. 2 shows a perspective view of an example sealing insert.

FIG. 2 shows an example sealing insert 200, such as may be used for forward sealing insert 150 in FIG. 1. Sealing insert 200 includes an insert wall (or walls) 210 defining and enclosing an insert interior space 212. Insert wall 210 may be defined as a continuous wall defining and enclosing insert interior space 212 or a plurality of adjoining walls, such as a rear wall 214 and two side walls 216, 218 around insert interior space 212. Insert wall 210 may have an insert wall inside surface 220 and an insert wall outside surface 222. In some embodiments, insert wall 200 may include a plurality of impingement jets 224 or other outlets for cooling fluid defined by a passage through insert wall 210. Not all surfaces or walls sections of insert wall 210 may include impingement jets 224 and their configurations (including number, size, spacing, pattern, output angle, etc.) may vary from one portion of insert wall 210 to another portion of insert wall 210. As shown, impingement jets 224 may be spaced vertically and horizontally around the surfaces of insert wall 210.

Sealing insert 200 may also include compressible seals 230, 240. Compressible seals 230, 240 protrude or extend from insert wall outside surface 222. In some embodiments, compressible seals 230, 240 extend substantially vertically along insert wall 210 for the height of sealing insert 200 such that they create cooling compartments adjacent sealing insert 200 in conjunction with the outer wall and other interior structures of the component into which sealing insert 200 is installed. Other orientations and configurations of compressible seals 230, 240 are possible to create desired cooling compartments and control cooling of adjacent portions of the component into which sealing insert 200 is installed. For example, compressible seals with a horizontal orientation could be used to divide the component cooling space into vertical bands or a combination of horizontal, vertical, curved, or other seal configurations may be used to define any desired size, shape, and location of cooling compartments.

In some embodiments, the complexity of compressible seal shapes and configurations may be produced through an additive manufacturing process and, more specifically, a laser-sintered metal or direct metal laser melting (DMLM) manufacturing platform. In some embodiments, sealing insert 200 may be manufactured entirely from laser-sintered metal as a continuous piece. For example, insert wall 210 and compressible seals 230, 240 may be made of the same material and without a seam or attachment between insert wall outside surface 222 and compressible seals 230, 240. In some embodiments, the component into which insert seal 200 is inserted may be manufactured by another process and using different materials, such as conventional casting and/or subtractive machining of the component.

When manufactured using additive manufacturing, sealing insert 200 may have a build direction coincident with the Z axis describing the direction in which materials were added to form the desired structure. In additive manufacture, a "build direction" of one or more components may be defined by a fabricator before raw materials are processed from raw materials into a desired structure. A build direction for a given component and/or sub-component therefore defines the order in which structural features are formed over time as raw materials (e.g., metallic powders) are sintered to form a structure. Such materials can include, e.g., one or more pure metals and/or alloys including without limitation: Copper (Cu), Chromium (Cr), Titanium (Ti), Nickel (Ni), aluminum (Al), etc. In an example embodiment, the build direction Z of sealing insert 200 can be oriented along one axis, and perpendicular to the plane of X and Y axis, and generally can be defined to assist in describing the three dimensional structure of the component, as well as the way in which it is formed. Sealing insert 200 is provided as an example only and variety of geometric shapes and configurations of insert wall 210 and compressible seals 230, 240 are possible. Regardless of the geometrical shape and configuration of sealing insert 200, sealing insert 200 can be composed of one or more laser-sintered metals or metallic materials, e.g., those currently-known or later developed for use in an additive manufacturing process.

Figure 3:
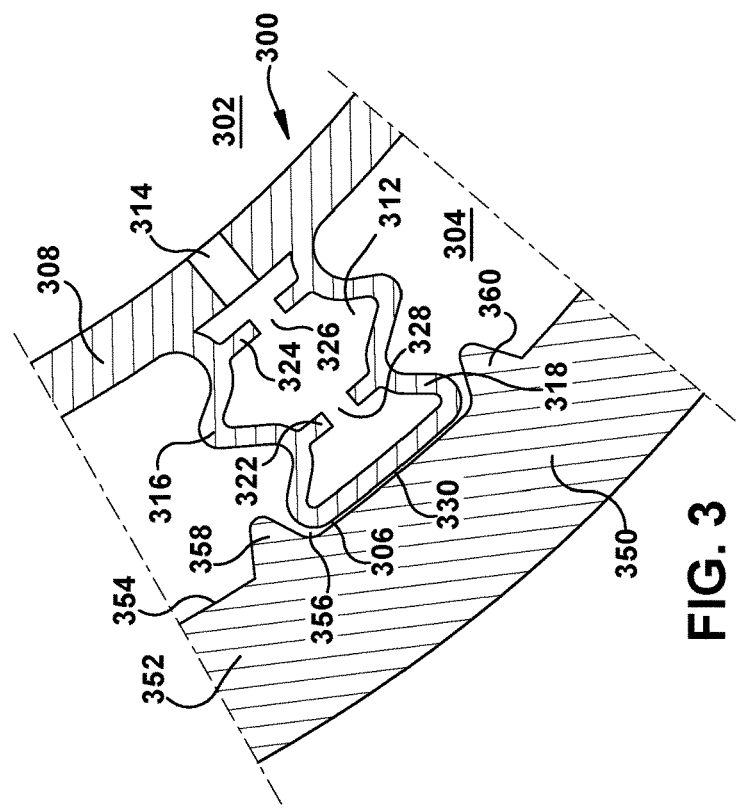
FIG. 3 shows a cross-section view of an example compressible seal.

FIG. 3 shows an example configuration of a compressible seal 300 engaged with interior surface 354 of an outer component wall 352 of a component 350 in which compressible seal 300 is installed. Compressible seal 300 may be a "bellows-seal" that is installed relative to component 350 in a relaxed state and then expanded by a pressure differential between insert interior space 302 and cooling space 304 adjacent outer component wall 352. In an expanded state, compressible seal 300 creates a compression force between a distal end 306 of compressible seal 300 and interior surface 354 of component 350. In some embodiments, compressible seal 300 is comprised of a spring/bellows wall (or walls) 316, 318 defining and enclosing a seal interior space 312 that is separate from cooling space 304 and has a restricted inlet 314 from insert interior space 302. Spring/bellows wall 310 may be defined as a continuous wall defining and enclosing seal interior space 312 or a plurality of adjoining walls, such as lateral spring/bellows walls 316, 318 and distal seal wall 330, further adjoining insert wall 308 around seal interior space 312. In some embodiments, compressible seal 300 may include lateral supports 322, 324 traversing seal interior space 312 to connect and support lateral spring/bellows walls 316, 318, and defining support through holes 326, 328 to allow fluid flow and pressure equalization throughout seal interior space 312. In the embodiment shown, interior surface 354 of component 350 also defines a guide channel 356 between guide rails 358, 360. The guide channel width between guide rails 358, 360 is greater than the width of distal end 306 of distal seal wall 320 to accommodate, locate, and retain compressible seal 300 relative to interior surface 354 of component 350. Guide channel 356 can be formed in a number of alternative ways other than through guide rails 358, 360. For example, although not shown, guide channel 356 may be formed as a recess in interior surface 354.

Figure 4:
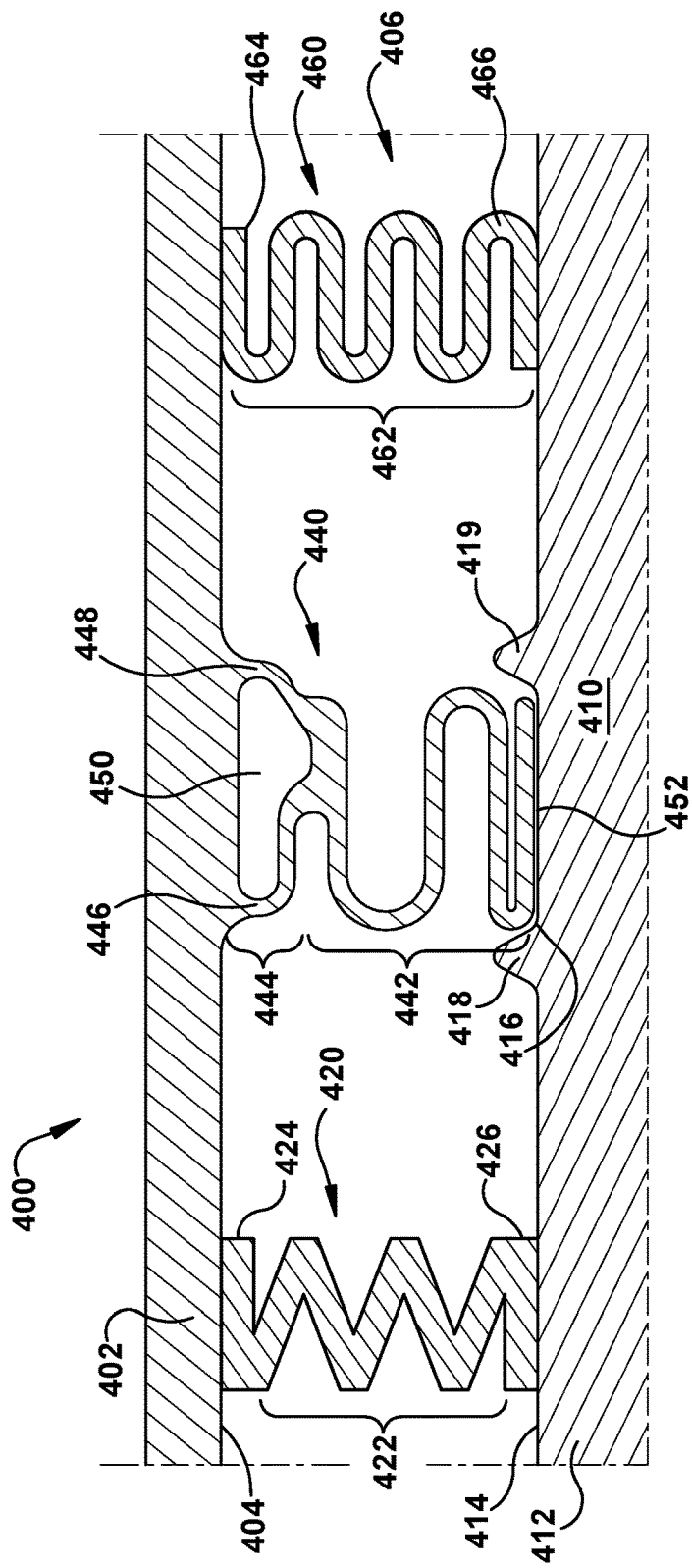
FIG. 4 shows a cross-section view of several example compressible seals.

FIG. 4 shows a plurality of example compressible seals 420, 440, 460 extending from an insert wall 402 of a sealing insert 400 and engaged with interior surface 414 of an outer component wall 412 of a component 410 in which sealing insert 400 is installed. Compressible seals 420, 440, 460 may be compressible spring/bellows seals each formed of at least one spring/bellows wall extending from exterior surface 404 of insert wall 402 to interior surface 414 of outer component wall 412 and held in compression when installed. For example, the relaxed state of each spring/bellows wall may be wider than cooling space 406 between exterior surface 404 and interior surface 414 such that the spring/bellows are compressed in response to sealing insert 400 being inserted into component 410. Compressible seals 420, 440, 460 may create a seal between sealing insert 400 and component 410 to divide cooling space 406 into separate cooling compartments. Compressible seal 420 is a zigzag spring/bellows 422 comprised of a plurality of flat portions connected by angled junctions. Compressible seal 420 may include a flat insert wall interface 424 and a flat distal end interface 426. Insert wall interface 424 may be made continuous with insert wall 402 and distal end interface 426 may be physically separate from outer component wall 412 and held in place against interior surface 414 by the compression force on compressible seal 420. Compressible seal 440 is a "W" spring/bellows 442 supported by a split base 444 and demonstrates more complex spring/bellows and interface structures. Compressible seal 440 may include split base 444 with insert wall interfaces 446, 448 and defining an internal support space 450. Unlike seal interior space 312 in FIG. 3, internal support space 450 may not be designed for expansion and may include an internally sealed space or one or more pressure outlets to allow it to equalize with one (but not both) of the adjacent cooling compartments. In the embodiment shown, distal end interface 452 is a compressed portion of the "W" spring/bellows 442. Insert wall interfaces 446, 448 may be made continuous with insert wall 402 and distal end interface 452 may be physically separate from outer component wall 412 and held in place against interior surface 414 by the compression force on compressible seal 440. In the embodiment shown, interior surface 414 of component 410 also defines a guide channel 416 between guide rails 418, 419. The guide channel width between guide rails 418, 419 is greater than the width of distal surface 454 of distal end interface 452 to accommodate, locate, and retain compressible seal 440 relative to interior surface 414 of component 410. Compressible seal 460 is a wave spring/bellows 462 comprised of a plurality of curved portions in sequentially opposed orientations. Compressible seal 460 may include a flat insert wall interface 464 and a flat distal end interface 466. Insert wall interface 464 may be made continuous with insert wall 402 and distal end interface 466 may be physically separate from outer component wall 412 and held in place against interior surface 414 by the compression force on compressible seal 460.

The above-described sealing inserts, compressible seals, and parts thereof can be manufactured using any now known or later developed technologies, e.g., machining, casting, etc. In one embodiment, however, additive manufacturing is particularly suited for manufacturing sealing inserts 150, 175, 200 and compressible seals 300, 420, 440, 460. As used herein, additive manufacturing (AM) may include any process of producing an object through the successive layering of material rather than the removal of material, which is the case with conventional processes. Additive manufacturing can create complex geometries without the use of any sort of tools, molds or fixtures, and with little or no waste material. Instead of machining components from solid billets of metal, much of which is cut away and discarded, the only material used in additive manufacturing is what is required to shape the part. Additive manufacturing processes may include but are not limited to: 3D printing, rapid prototyping (RP), direct digital manufacturing (DDM), selective laser melting (SLM) and direct metal laser melting (DMLM). In the current setting, DMLM has been found advantageous.

Figure 5:
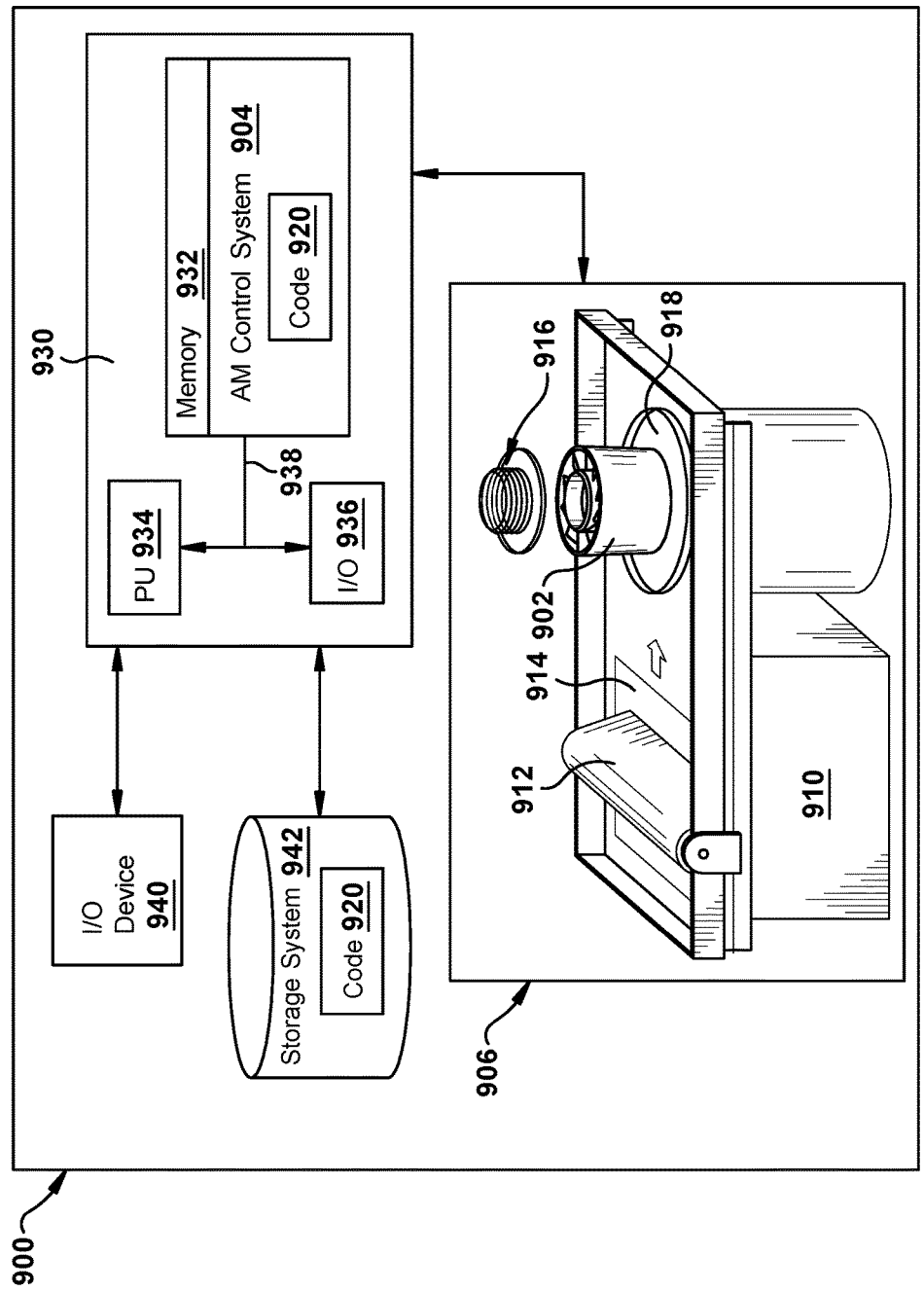
FIG. 5 shows a block diagram of an additive manufacturing process including a non-transitory computer readable storage medium storing code representative of a sealing insert.

To illustrate an example additive manufacturing process, FIG. 5 shows a schematic/block view of an illustrative computerized additive manufacturing system 900 for generating an object 902. In this example, system 900 is arranged for DMLM. It is understood that the general teachings of the disclosure are equally applicable to other forms of additive manufacturing. Object 902 is illustrated as a double walled turbine element; however, it is understood that the additive manufacturing process can be readily adapted to manufacture sealing inserts. AM system 900 generally includes a computerized additive manufacturing (AM) control system 904 and an AM printer 906. AM system 900, as will be described, executes code 920 that includes a set of computer-executable instructions defining sealing inserts 150, 175, 200 and compressible seals 300, 420, 440, 460 to physically generate one or more of these objects using AM printer 906. Each AM process may use different raw materials in the form of, for example, fine-grain powder, liquid (e.g., polymers), sheet, etc., a stock of which may be held in a chamber 910 of AM printer 906. In the instant case, sealing inserts 150, 175, 200 and compressible seals 300, 420, 440, 460 may be made of stainless steel or similar materials. As illustrated, an applicator 912 may create a thin layer of raw material 914 spread out as the blank canvas from which each successive slice of the final object will be created. In other cases, applicator 912 may directly apply or print the next layer onto a previous layer as defined by code 920, e.g., where the material is a polymer. In the example shown, a laser or electron beam 916 fuses particles for each slice, as defined by code 920. Various parts of AM printer 906 may move to accommodate the addition of each new layer, e.g., a build platform 918 may lower and/or chamber 910 and/or applicator 912 may rise after each layer.

AM control system 904 is shown implemented on computer 930 as computer program code. To this extent, computer 930 is shown including a memory 932, a processor 934, an input/output (I/O) interface 936, and a bus 938. Further, computer 930 is shown in communication with an external I/O device/resource 940 and a storage system 942. In general, processor 934 executes computer program code, such as AM control system 904, that is stored in memory 932 and/or storage system 942 under instructions from code 920 representative of sealing inserts 150, 175, 200 and compressible seals 300, 420, 440, 460, described herein. While executing computer program code, processor 934 can read and/or write data to/from memory 932, storage system 942, I/O device 940 and/or AM printer 906. Bus 938 provides a communication link between each of the components in computer 930, and I/O device 940 can comprise any device that enables a user to interact with computer 940 (e.g., keyboard, pointing device, display, etc.). Computer 930 is only representative of various possible combinations of hardware and software. For example, processor 934 may comprise a single processing unit, or be distributed across one or more processing units in one or more locations, e.g., on a client and server. Similarly, memory 932 and/or storage system 942 may reside at one or more physical locations. Memory 932 and/or storage system 942 can comprise any combination of various types of non-transitory computer readable storage medium including magnetic media, optical media, random access memory (RAM), read only memory (ROM), etc. Computer 930 can comprise any type of computing device such as a network server, a desktop computer, a laptop, a handheld device, a mobile phone, a pager, a personal data assistant, etc.

Additive manufacturing processes begin with a non-transitory computer readable storage medium (e.g., memory 932, storage system 942, etc.) storing code 920 representative of sealing inserts 150, 175, 200 and compressible seals 300, 420, 440, 460. As noted, code 920 includes a set of computer-executable instructions defining outer electrode that can be used to physically generate the tip, upon execution of the code by system 900. For example, code 920 may include a precisely defined 3D model of outer electrode and can be generated from any of a large variety of well-known computer aided design (CAD) software systems such as AutoCAD®, TurboCAD®, DesignCAD 3D Max, etc. In this regard, code 920 can take any now known or later developed file format. For example, code 920 may be in the Standard Tessellation Language (STL) which was created for stereo-lithography CAD programs of 3D Systems, or an additive manufacturing file (AMF), which is an American Society of Mechanical Engineers (ASME) standard that is an extensible markup-language (XML) based format designed to allow any CAD software to describe the shape and composition of any three-dimensional object to be fabricated on any AM printer. Code 920 may be translated between different formats, converted into a set of data signals and transmitted, received as a set of data signals and converted to code, stored, etc., as necessary. Code 920 may be an input to system 900 and may come from a part designer, an intellectual property (IP) provider, a design company, the operator or owner of system 900, or from other sources. In any event, AM control system 904 executes code 920, dividing sealing inserts 150, 175, 200 and compressible seals 300, 420, 440, 460 into a series of thin slices that it assembles using AM printer 906 in successive layers of liquid, powder, sheet or other material. In the DMLM example, each layer is melted to the exact geometry defined by code 920 and fused to the preceding layer. Subsequently, the outer electrode may be exposed to any variety of finishing processes, e.g., minor machining, sealing, polishing, assembly to other part of sealing inserts 150, 175, 200 and compressible seals 300, 420, 440, 460, etc.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A sealing insert comprising:
   at least one insert wall for insertion proximate a component wall to define a space between the at least one insert wall and the component wall;
   at least one compressible seal formed unitarily with, and protruding outwardly from, the at least one insert wall and slidably engaging the component wall, the at least one compressible seal including at least one lateral support traversing a hollow interior of the at least one compressible seal, wherein the at least one compressible seal divides the space into a plurality of compartments and the plurality of compartments each have fluid communication with at least one fluid inlet within the at least one insert wall and at least one fluid outlet within the component wall that are separate from each other compartment.

2. The sealing insert of claim 1, wherein the at least one insert wall and at least one compressible seal are selected from a laser-melted component or a laser-sintered metal component.

3. The sealing insert of claim 1, wherein the at least one insert wall defines and encloses an insert interior space and includes a plurality of impingement jets between the insert interior space and the space.

4. The sealing insert of claim 3, wherein the at least one insert wall defines a first configuration of impingement jets as fluid inlets into a first compartment from the plurality of compartments and a second configuration of impingement jets as fluid inlets into a second compartment from the plurality of compartments.

5. The sealing insert of claim 1, wherein the at least one compressible seal comprises a metal spring formed continuous with an outer surface of the insert wall facing the space, the metal spring extending a length of the insert wall and compressing perpendicular to the outer surface in response to a distal surface of the metal spring engaging with the component wall.

6. The sealing insert of claim 1, wherein the at least one compressible seal includes at least one spring wall formed continuous with an outer surface of the insert wall, wherein the hollow interior of the at least one compressible seal is separate from the plurality of compartments.

7. The sealing insert of claim 6, wherein the at least one insert wall defines and encloses an insert interior space and includes at least one opening between the insert interior space and the seal interior space.

8. The sealing insert of claim 1, wherein the at least one compressible seal includes a distal surface for slidably engaging the component wall, wherein the distal surface has a seal width that is less than a guide width of a guide channel formed in the component wall, the guide channel including a pair of protrusions extending outwardly from the component wall, such that the at least one compressible seal is disposed between the pair of protrusions.

9. A turbine component comprising:
a component wall defining a component interior space;
an insert including:
at least one insert wall and inserted into the component interior space to define a space between the at least one insert wall and the component wall;
at least one compressible seal formed unitarily with, and protruding outwardly from, the at least one insert wall and slidably engaging the component wall, the at least one compressible seal including at least one lateral support traversing a hollow interior of the at least one compressible seal, wherein the at least one compressible seal divides the space into a plurality of compartments and the plurality of compartments each have fluid communication with at least one fluid inlet within the at least one insert wall and at least one fluid outlet within the component wall that are separate from each other compartment.

10. The turbine component of claim 9, wherein the at least one insert wall and at least one compressible seal are a single metal component selected from a laser-sintered component or a laser-melted component.

11. The turbine component of claim 9, wherein the at least one insert wall defines and encloses an insert interior space and includes a plurality of impingement jets between the insert interior space and the space.

12. The turbine component of claim 11, wherein the at least one insert wall defines a first configuration of impingement jets as fluid inlets into a first compartment from the plurality of compartments and a second configuration of impingement jets as fluid inlets into a second compartment from the plurality of compartments.

13. The turbine component of claim 9, wherein the at least one compressible seal includes a metal spring formed continuous with an outer surface of the insert wall facing the space, the metal spring extending a length of the insert wall and compressing perpendicular to the outer surface in response to a distal surface of the metal spring engaging with the component wall.

14. The turbine component of claim 9, wherein the at least one compressible seal includes at least one spring wall formed continuous with an outer surface of the insert wall and defining a seal interior space that is separate from the plurality of compartments.

15. The turbine component of claim 14, wherein the at least one insert wall defines and encloses an insert interior space and includes at least one opening between the insert interior space and the seal interior space.

16. The turbine component of claim 9, wherein the at least one compressible seal includes a distal surface for slidably engaging the component wall and a guide channel is formed in the component wall to receive the distal surface, the guide channel including a pair of protrusions extending outwardly from the component wall, wherein the distal surface has a seal width that is less than a guide width of the guide channel and the at least one compressible seal is disposed between the pair of protrusions.

17. A non-transitory computer readable storage medium storing code representative of a laser-sintered sealing insert, the laser-sintered sealing insert being physically generated upon execution of the code, the laser-sintered sealing insert comprising:
at least one insert wall for insertion proximate a component wall to define a space between the at least one insert wall and the component wall;
at least one compressible seal formed unitarily with, and protruding outwardly from, the at least one insert wall and slidably engaging the component wall, the at least one compressible seal including at least one lateral support traversing a hollow interior of the at least one compressible seal, wherein the at least one compressible seal divides the space into a plurality of compartments and the plurality of compartments each have fluid communication with at least one fluid inlet within the at least one insert wall and at least one fluid outlet within the component wall that are separate from each other compartment.

18. The non-transitory computer readable storage medium storing code representative of the laser-sintered sealing insert of claim 17, wherein the at least one insert wall and at least one compressible seal are continuous metal components forming a single piece and selected from a laser-sintered component or a laser-melted component.

19. The non-transitory computer readable storage medium storing code representative of the laser-sintered sealing insert of claim 17, wherein the at least one insert wall defines and encloses an insert interior space and includes a plurality of impingement jets between the insert interior space and the space, including a first configuration of impingement jets as fluid inlets into a first compartment from the plurality of compartments and a second configuration of impingement jets as fluid inlets into a second compartment from the plurality of compartments.

20. The non-transitory computer readable storage medium storing code representative of the laser-sintered sealing insert of claim 17, wherein the at least one compressible seal includes at least one spring wall formed continuous with an outer surface of the insert wall, wherein the at least one insert wall defines and encloses an insert interior space and includes at least one opening between the insert interior space and the seal interior space.

* * * * *